Oct. 3, 1961  R. J. MORSE  3,002,520
SUPPLY AND EXHAUST VALVE WITH SNAP ACTION
Filed Dec. 14, 1959  3 Sheets-Sheet 1

INVENTOR
ROBERT J. MORSE
BY *Scrivener & Parker*
ATTORNEY

United States Patent Office — 3,002,520 — Patented Oct. 3, 1961

3,002,520
SUPPLY AND EXHAUST VALVE WITH
SNAP ACTION
Robert J. Morse, Elyria, Ohio, assignor to Bendix-Westinghouse Automotive Air Brake Company, Elyria, Ohio, a corporation of Delaware
Filed Dec. 14, 1959, Ser. No. 860,302
11 Claims. (Cl. 137—102)

This invention relates to fluid pressure valve or governor devices and more particularly to fluid pressure governors for unloading fluid compressors, controlling emergency lines in fluid pressure brake systems and for other similar uses.

While the invention is useful in various installations, it has particular utility in air brake systems using emergency and service lines and wherein it is desirable to exhaust the emergency line rapidly to set the trailer brakes in the event of loss of pressure between a tractor and a trailer or in the event of low pressure in the tractor reservoir. Where tractor protection valves are used to conserve air on the tractor while simultaneously exhausting the trailer emergency line in the event of brake system derangement, the present invention is particularly useful for providing rapid positive control of the tractor protection valve to either open or close the same depending on the pressure conditions in the tractor main reservoir.

A principal object of the invention therefore is the provision of a valve or governing device which may be installed between a fluid pressure source and a pressure responsive device to effect rapid positive control of the device in accordance with changes in the source pressure.

A more specific object of the invention is the provision of a governing device of the above type which effects rapid admission of fluid to the pressure responsive device when the pressure of the source arrives at a first predetermined level and rapidly exhausts fluid from the device when the pressure of the source falls below a second predetermined level less than the first level.

Another object of the invention is the provision of a fluid pressure governor which moves to its fully open or closed positions with a snap action.

It is a further object of the invention to provide a snap acting fluid pressure governor wherein the snap action is achieved through the sudden increase or decrease in motive area exposed to the source pressure with said area increase or decrease being accompanied simultaneously with the closing or opening of inlet and exhaust means depending upon whether the source pressure is rising above or falling below the first and second predetermined operating pressures of said source.

Still another object of the invention is the provision of a fluid pressure governor which is reliable in operation, constructed of a minimum number of parts and whose proper operation is not in any way affected by the rate of pressure change in the system.

A still further object of the invention is the provision of a fluid pressure governor which is particularly well suited for use in automotive fluid brake systems where it is desired to effect rapid exhaustion of an emergency line, or the control chamber of a tractor protection valve, or to unload a compressor.

Other objects and their attendant advantages will become apparent as the following detailed description is read in conjunction with the accompanying drawings wherein.

Figure 1:
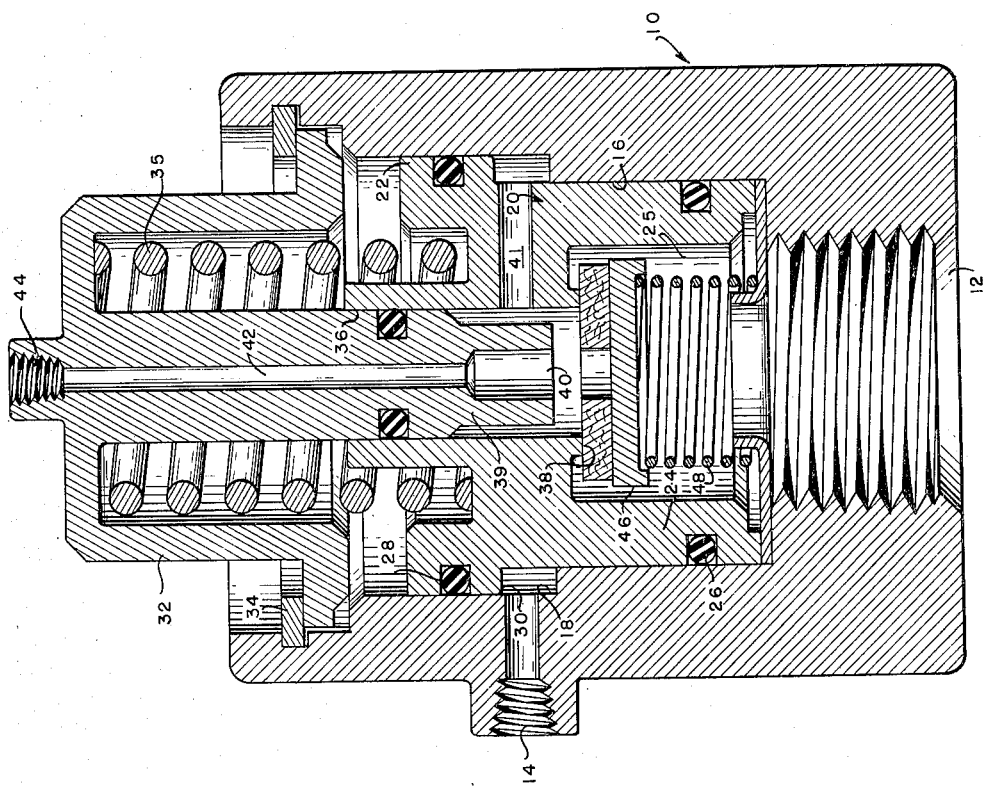
FIG. 1 is a cross-sectional view of one embodiment of the invention wherein the increase or decrease in motive area is afforded by a stepped piston.

Referring first to FIG. 1, the valve or governor of the invention comprises a casing forming a hollow body 10 having inlet and control ports 12, 14, respectively connected to a pressure source (not shown) such as a main reservoir carried on a tractor and to a device to be controlled (not shown) such as the operating cavity of a tractor protection valve similar, for example, to that shown in the patent to Ellery R. Fitch #2,645,308, dated July 14, 1953, wherein said valve opens the service and emergency lines by the pressure in the operating cavity of the valve when the tractor reservoir pressure reaches a predetermined operating level and which closes said valve when said main reservoir pressure falls below a minimum safe value, the closure being effected preferably with great speed through the rapid exhaustion of pressure in the operating cavity. For purposes of illustration, therefore, the control port 14 can be considered connected to said operating cavity to control said tractor protection valve and the inlet port can be considered connected to said tractor reservoir as aforesaid.

The body 10 of the valve of the invention illustrated in FIG. 1 contains an inlet chamber 16 and a co-axially arranged control chamber 18 of greater diameter than said inlet chamber with each respectively being connected with the aforedescribed ports 12 and 14. Within the body is a movable member 20 comprising a stepped piston having an upper portion 22 received in the control chamber 18 and a lower portion 24 received in the inlet chamber 16. Each portion of the piston is sealed with respect to its chamber wall by respective seal rings 26 and 28 and it will be observed that the portion 24 of the piston 20 received in the inlet chamber 16, including a valve cavity 25 in said piston, affords on its side exposed to the pressure from the inlet port 12 a first motive area whereas the portion 22 of the piston received in the control chamber affords on its lower side or step a second motive area 30 which is exposed to whatever pressure may prevail in the control chamber 18.

The piston 20 is movable between a first position shown in the drawing and a second position determined by stop means which may be the lower edge of a cap member 32 which is retained in position by a snap ring 34. Movement of the piston 20 by pressure in the inlet chamber is opposed by a spring 35. The piston 20 is provided with an axial bore 36 and a fluid port 38 which with a suitable drilled passageway 41 affords a connection between the inlet and control chambers 16, 18. Slideably received in the axial bore 36 is a fixed member 39 whose upper end may be integral with the cap member 32 as shown and whose free end, which is received in the bore of the movable member, contains an exhaust orifice 40 which may be connected to atmosphere through a passage 42 and an exhaust port 44 through the center of the fixed member 39. When the movable member is in the position shown, the extremity of the free end of the fixed member is intermediate the ends of the bore 36 and hence the exhaust orifice 40 is open to the control chamber 18 so that the latter and any pressure responsive member connected to its port 14 are at atmospheric pressure.

A single disc valve 46 is provided in the valve cavity 25 of the piston to control both the fluid port 38 and the exhaust orifice 40 and in the first position of the piston 20 shown in the drawing the valve is resiliently urged by a spring 48 into sealing engagement with the port to cut off communication between the inlet and control chambers. The valve 46 is so designed that when the piston 20 is moved toward its second position by build-up of pressure in the inlet chamber, the valve 46 after short initial movement engages the end of fixed member 39 and closes the exhaust orifice 40. Thereafter as the piston continues to move toward its second position, the valve 46 is disconnected from the port 38 and connects the pressure in the inlet chamber with the control chamber.

Assuming the inlet port 12 is connected with the main reservoir of a tractor-trailer braking system and assuming that the control port 14 is connected with the operating cavity of a tractor protection valve, the governor of the invention operates as follows:

With a no-air condition, the parts of the governor occupy the first position of the drawings. As the pressure in the system builds up to the desired pressure, say 55 p.s.i., the pressure in the inlet chamber exerts a force on the motive area of that portion of the movable piston 20 exposed to inlet pressure and in the embodiment illustrated this would of course include the underside of the valve 46. As the pressure increases, the force of the inlet pressure gradually overcomes the opposition of the spring 35 and the piston commences moving toward its second position. As the pressure continues to increase, the piston continues its upward movement until the valve 46 engages the end of the fixed member 39 and thus closes the exhaust orifice 40. A very slight further movement of the piston 20 then cracks the sealing engagement of the valve 46 with the fluid port 38 to admit inlet pressure to the control chamber 18. As soon as this occurs, the motive area 30 of the upper portion 22 of the piston 20 is added to the motive area below portion 24 of the piston in the inlet cavity so that the inlet pressure acting on the increased area exerts an increased force on the piston to move it immediately and with a snap action to its second or full open position against the stop afforded by the cap 32. Full inlet pressure is then communicated through port 14 to the operating chamber of the tractor protection valve moving it to open position so that the trailer emergency line and reservoir can be charged to operating pressure. Since this sudden rush of pressure from the tractor reservoir to the trailer reservoir will momentarily reduce the tractor reservoir pressure below the opening pressure of the governor, it is desirable that the closing pressure thereof be substantially below its opening pressure. This, of course, is provided by the increased area afforded by the piston motive surface 30 in the control chamber so that, for example, the pressure in the main reservoir would have to fall below 45 p.s.i. before the piston 20 could be moved by the spring 35 toward its first position. Obviously, the opening and closing pressures could be varied as desired by the use of variously loaded springs and by varying the relative sizes of the motive areas.

Assume now that the parts of the governor are in the full open position as described and the pressure drops in the trailer system so that the main reservoir pressure begins to fall. As the pressure approaches the minimum cut-out pressure of say 45 p.s.i., the spring 35 commences to move the piston 20 from its second position toward its first position. As the piston continues to move downwardly the fluid port 38 engages the valve 46 seated on the end of the fixed member 39 thus closing the connection between the inlet and control cavities. Very slight further downward movement of the piston 20 unseats the valve 46 from the exhaust orifice 40 permitting the fluid pressure in the control chamber 18 to commence flowing to atmosphere by way of passageway 41, orifice 40, passage 42 and port 44. As soon as this occurs motive pressure is removed from the area 30 of the upper portion 22 of the piston 20 and the total force in inlet cavity 16 now opposing spring 35 being well below its closing force, the spring immediately moves the piston with a snap action to its first position as shown in the drawing, fully opening the exhaust orifice to connect the control chamber and the operating cavity of the tractor protection valve to atmosphere which, as soon as exhausted, immediately moves to closed position thereby preserving the remaining pressure in the tractor main reservoir while simultaneously exhausting the trailer emergency line.

Figure 2:
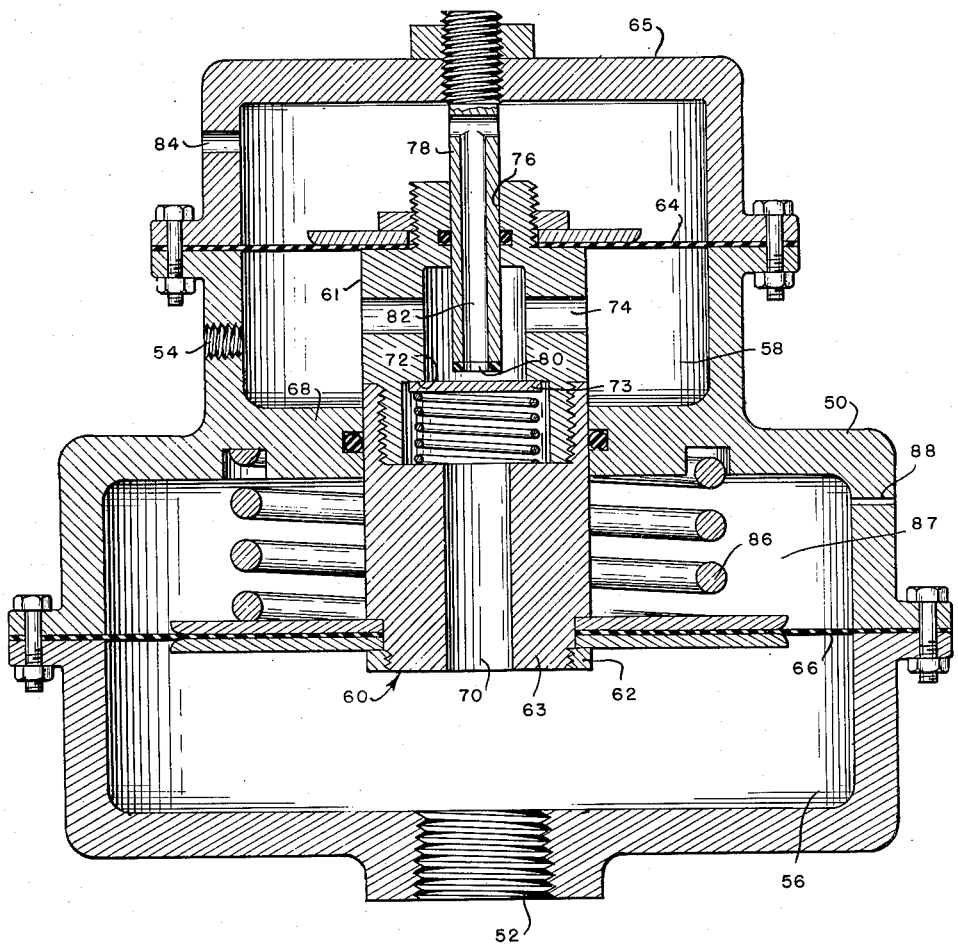
FIG. 2 is a cross-sectional view of another embodiment similar to FIG. 1 except increase or decrease in area is afforded by diaphragms.

Referring now to FIG. 2, the embodiment of the invention there illustrated is substantially the same as the embodiment just described but instead of utilizing a stepped piston to provide differential motive areas there are provided in the inlet and exhaust chambers flexible diaphragms which serve substantially the same purpose as the differential areas of the stepped piston.

Specifically, the governor of FIG. 2 comprises a body 50 having inlet and control ports 52, 54 respectively connecting a pressure source and a device to be controlled to inlet and control cavities or chambers 56, 58. Within the body 50 is a movable member 60 having an upper portion 61 received in said control chamber and a lower portion 63 received in said inlet chamber. The upper portion 61 has connected thereto a diaphragm 64 whose outer edges may be clamped between flanges on the body 50 and flanges of a cap member 65. The lower portion 63 of the movable member has attached thereto as by a nut 62, a diaphragm 66 whose outer edges may likewise be clamped between mating flanges of portions of the body 50. The movable member 60 is slidingly received in a sealed aperture through a wall 68 separating the inlet and control chambers and has an axial fluid passage 70 which includes a fluid port 72 controlled by a spring-loaded disc valve 73 and which with horizontal passages 74 serves to connect the inlet and control chambers. The movable member has through its upper end an axial bore 76 which slideably receives a fixed member 78 having an exhaust orifice 80 in its free end for connecting the control chamber 58 to atmosphere through an exhaust passage 82 and an exhaust port 84 in the cap member 65. Movement of the member 60 from its first position of FIG. 2 is opposed by a spring 86 acting between the wall 68 and the upperside of diaphragm 66. A cavity 87 in which the spring 86 is positioned is vented to atmosphere through a port 88.

The operation of the embodiment of FIG. 2 is substantially identical to that described in FIG. 1. With the parts in the first position of the drawing and assuming no-air conditions, the valve 73 is seated on the fluid port 72 to cut off the connection between the inlet and control chambers 56 and 58 and the latter is connected to atmosphere through the exhaust orifice 80. As the pressure builds up in the inlet chamber 56 the diaphragm 66 and the movable member 60 commence moving upwardly until the valve 73 seats on the exhaust orifice 80 thereby disconnecting control chamber 58 from atmosphere. Slight additional movement of member 60 cracks the sealing engagement between fluid port 72 and valve 73 permitting fluid in the inlet cavity 56 to flow into control chamber 58 and act upon the differential motive area afforded by the diaphragm 64 so that the movable member is then moved rapidly with a snap action against the force of spring 86 to its second or full open position permitting inlet pressure to be communicated to the device to be controlled by way of port 54.

Should the pressure in the system fall below a predetermined pressure less than the cut-in pressure as determined by the spring-loading and relative areas of the two motive surfaces afforded by the diaphragms 64 and 66, the spring 86 commences moving the movable member 60 toward its first position. As the member 60 moves downwardly the fluid port 72 picks up the valve 73 closing the fluid port and immediately thereafter opening the exhaust orifice 80 so that the pressure in the control chamber 58 starts exhausting to atmosphere. As soon as this commences, the pressure acting on the motive area afforded by the diaphragm 64 is relieved permitting the spring 86 to move the member 63 to its first position rapidly and with a snap action to open the exhaust orifice fully and permit rapid exhaustion of the fluid pressure from the device being controlled.

Figure 3:
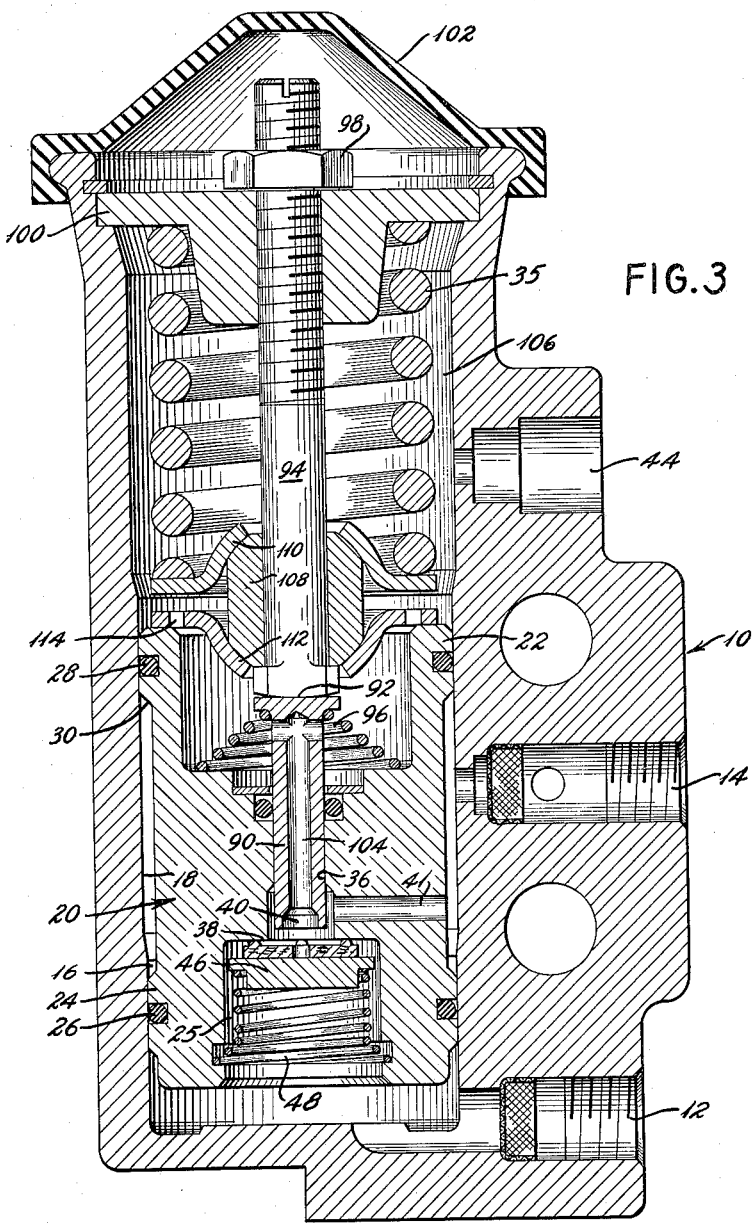
FIG. 3 is a cross-sectional view of a still further form of the invention which is generally similar to the form of FIG. 1.

The form of the invention illustrated in FIG. 3 is generally similar to that shown in FIG. 1 and like reference numerals have been used to denote similar parts. In this embodiment, a member 90 is slideably received within the bore 36 of the piston 20 and is constantly urged into contact with the lower enlarged head 92 of the fixed member 94 as by means of a spring 96. Fixed member 94 is threaded at its upper end and a nut 98 is provided in order to adjust the position of the member 94 with respect to a collar 100 which is suitably connected to the body 10. The top assembly may be covered by a resilient cap 102. Member 90 is provided at its lower end with exhaust orifice 40 which normally serves to connect the control port 14 with the exhaust port 44 by way of a bore 104 in member 90 and chamber 106.

A novel arrangement is provided for seating the lower end of the spring 35 with respect to the fixed member 94. As shown, a spherical member 108 having its top and bottom portions as well as its opposite side portions cut away to provide parallel flat portions is slideably received at the lower end of the fixed member 94. Similarly formed dished washers 110 and 112 respectively engage the upper and lower spherical zones of the member 108 and this assembly forms an effective means for confining the spring 35 between the collar 100 and the enlarged head 92 of the fixed member 94 in a properly aligned fashion regardless of the fact that the lower end of the spring 35 might not present a plane surface normal to the spring axis. Openings 114 in the washer 112 insures constant communication between the bore 104 and the atmospheric chamber 106.

From the above described construction it will be seen that the member 90 which is received within the bore 36 of the stepped piston 20 is separate from the fixed member 94, and that the lower end 92 of the latter is slightly rounded, as shown. This permits some slight misalignment in the axial position of the bore 36 without affecting the movement of the piston 20 during operation of the device.

The operation of the embodiment of FIG. 3 is identical to that described in FIG. 1 and further description thereof is believed unnecessary.

From the foregoing description of the invention disclosed in the drawings, it will be seen that the invention provides a positive and rapid means for admitting pressure to or exhausting pressure from a pressure controlled device. It will be apparent that with the use of a single disc valve controlling both the exhaust orifice and the fluid port between the inlet and control chambers, the parts of the valve can assume a "lapped" position in which both the exhaust and fluid port are closed so that the parts are, in a sense, locked against further movement. The movable member of the invention moves readily in response to pressure changes and whenever, during the course of movement of the movable member, the valve is seated to block either the exhaust orifice or the fluid port and is thereby unseated from the other, the movable member must move to its full extent of travel in the direction of its initial movement and it must do so with a snap action, as a result of the instantaneous change of control areas. Since the device operates essentially on pressure level, it is not affected by the rate of fluid pressure loss in the system and does not permit the system to blow down through a slow leak to practically atmospheric pressure without operating. This has been a disadvantage of certain pressure responsive devices and it is for use with this type of device that the governor of the invention is paritcularly suited.

This application is a continuation-in-part of my application Serial No. 690,863, filed October 17, 1957.

It will be apparent that the governor of the invention can be modified in various ways without departing from the scope of the invention as set forth in the appended claims.

What is claimed is:

1. A fluid pressure governor comprising a body having inlet and control chambers and respective pressure ports, a movable member in said body having an axial bore therethrough and first and second motive areas respectively exposed to the pressures in said inlet and control chambers, said members having fluid port means affording a connection between said chambers and being movable between first and second positions, in response to the pressures received on said motive areas, a spring acting on said movable member in opposition to pressures acting on said motive areas, a member fixed in said body and having a free end axially received in said bore of said movable member and having an exhaust orifice therein, a single disc valve engageable with said fluid port means and said exhaust orifice, resilient means acting on said valve tending to move it in a direction closing said port means and orifice, said valve, port means and orifice being arranged so that when said movable member is in its first position said valve is engaged with said port means and disengaged from said orifice and vice versa when said member is in its second position, movement of said member between its positions enabling said valve to engage either said port means or said orifice to effect closing of one and opening of the other to admit or exhaust inlet pressure to or from said second motive area in said control chamber whereby upon such admission or exhaustion said movable member moves to its first or second position with a snap action.

2. A fluid pressure governor comprising a body having coaxially arranged inlet and control chambers and respective pressure ports, a member in said body movable between first and second positions and having one part having an axial bore therein extending into said control chamber and another part extending into said inlet chamber and having a fluid pressure port therein coaxially arranged with respect to said bore, said port affording a fluid connection between said inlet and control chambers, first and second pressure receiving motive areas connected respectively to the parts of said movable member in said inlet and control chambers, a member fixed in said body and having a free end axially and slideably received in the bore in that part of the movable member received in said control chamber, said free end having an exhaust orifice therein in axial alignment with said fluid port, said orifice communicating with said control chamber when said movable member is in its first position, a disc valve coaxially arranged with respect to said fluid port in said movable member and with said orifice in said fixed member, said valve, fluid port, orifice and movable member being arranged that movement of said member between its positions enables said valve to engage either said port or said orifice to effect closing of one and opening of the other to admit or exhaust inlet pressure to or from said second motive area in said control chamber whereby upon such admission or exhaustion said movable member moves to its first or second position with a snap action.

3. The fluid pressure governor of claim 2 wherein the first and second pressure receiving motive areas comprise diaphragms, each peripherally sealed by clamping portions of said body.

4. The fluid pressure governor of claim 2 wherein said movable member comprpises a stepped piston having a portion of one diameter disposed in said control chamber and a portion of less diameter disposed in said inlet chamber, and wherein the sides of said piston exposed respectively to said inlet and control chambers afford respectively said first and second motive areas.

5. A fluid pressure governor comprising a casing forming a hollow body divided interiorly into a first chamber at its lower end and a second chamber of greater diameter at its upper end, a stepped piston received in said chambers and having upper and lower portions of a size corresponding to the respective diameters of said chambers, said piston being movable between first and second positions and having an axial bore therethrough extending from its upper through its lower sides, an inlet port at the lower end of said casing communicating with the lower side of said piston, an exhaust port connected to atmosphere at the upper end of said casing, and a control port intermediate the ends of said casing communicating with said upper chamber below the stepped portion of said piston, a spring acting on said piston to resist movement thereof from its first to its second position, a fluid passage means in said piston for communicating said bore at all times with said control port and the stepped portion of said piston, a member in said casing having one end fixed to the upper end of said casing and a free end projecting axially downwardly into said bore with the extremity of said free end being intermediate the ends of said bore when said piston is in its first position, said piston being slideable on said fixed member, said fixed member having an axial passage therethrough communicating with said exhaust port, and the lower end of said passage forming an exhaust orifice which connects said control port to atmosphere through said fluid passage means and bore when said piston is in its first position, a single disc valve resiliently urged into sealing engagement with the lower end of said bore when said piston is in its first position, said valve when said piston is in its second position sealingly engaging said orifice to disconnect said control port from atmosphere and being disengaged from the end of said bore to connect said inlet port with said bore and said control port.

6. A governor comprising a body having an inlet port and chamber and a control port and chamber, said control chamber being of a greater cross-sectional size than said inlet chamber, a stepped piston in said body having an axial bore therethrough and having one portion slidingly received in said inlet chamber and a second portion slidingly received in said control chamber, spring means acting on said piston to oppose the pressure of said inlet chamber, a first member having a free end axially recevied in said bore and having an exhaust orifice therein, a pressure port in said piston coaxially arranged with respect to said bore for affording a connection through said piston from said inlet to said control chambers, said piston being movable between two positions, a single disc valve, resilient means normally urging said valve to close said connection, said valve, port and orifice being arranged that when said piston is in its first position said valve engages said port to disconnect said inlet and control chambers and is out of engagement with said orifice to connect said control chamber to exhaust, and when said piston is in its second position said valve is disengaged from said port to connect said inlet and control chambers and engaged with said orifice to disconnect said control chamber from exhaust, movement of said piston between its positions effecting engagement and disengagement of said valve with said port and orifice so that opening of one and closing of the other admits or exhausts pressure from or to the portion of said piston in said control chamber whereby said piston upon opening or closing of said port or orifice thereafter moves with a snap action.

7. A fluid pressure governor comprising a body having inlet and control chambers and respective pressure ports, a movable member in said body having an axial bore therethrough and first and second motive areas respectively exposed to the pressures in said inlet and control chambers, said member having fluid port means affording a connection between said chambers and being movable between first and second positions, in response to the pressures received on said motive areas, a spring acting on said movable member in opposition to pressures acting on said motive areas, a first member having one end fixed in said body and having a free end positioned adjacent said movable member, a second member axially received in said bore of said movable member and having an exhaust orifice therein, resilient means for constantly maintaining said second member in engagement with the free end of said first member, a single disc valve engageable with said fluid port means and said exhaust orifice, resilient means acting on said valve tending to move it in a direction closing said port means and orifice, said valve, port means and orifice being arranged so that when said movable member is in its first position said valve is engaged with said port means and disengaged from said orifice and vice versa when said member is in its second position, movement of said member between its positions enabling said valve to engage either said port means or said orifice to effect closing of one and opening of the other to admit or exhaust inlet pressure to or from said second motive area in said control chamber whereby upon such admission or exhaustion said movable member moves to its first or second position with a snap action.

8. A fluid pressure governor comprising a body having coaxially arranged inlet and control chambers and respective pressure ports, a member in said body movable between first and second positions and having one part having an axial bore therein extending into said control chamber and another part extending into said inlet chamber and having a fluid pressure port therein coaxially arranged with respect to said bore, said port affording a fluid connection between said inlet and control chambers, first and second pressure receiving motive areas connected respectively to the parts of said movable member in said inlet and control chambers, a first member having one end fixed in said body and having a free end positioned adjacent said movable member, a second member axially and slideably received in the bore in that part of the movable member received in said control chamber, said second member having an exhaust orifice therein in axial alignment with said fluid port, resilient means for constantly maintaining said second member in engagement with the free end of said first member, said orifice communicating with said control chamber when said movable member is in its first position, a disc valve coaxially arranged with respect to said fluid port in said movable member and with said orifice in said second member, said valve, fluid port, orifice and movable member being arranged that movement of said member between its positions enables said valve to engage either said port or said orifice to effect closing of one and opening of the other to admit or exhaust inlet pressure to or from said second motive area in said control chamber whereby upon such admission or exhaustion said movable member moves to its first or second position with a snap action.

9. The fluid pressure governor of claim 8 wherein said movable member comprises a stepped piston having a portion of one diameter disposed in said control chamber and a portion of less diameter disposed in said inlet chamber, and wherein the sides of said piston exposed respectively to said inlet and control chambers afford respectively said first and second motive areas.

10. A fluid pressure governor comprising a casing forming a hollow body divided interiorly into a first chamber at its lower end and a second chamber of greater diameter at its upper end, a stepped piston received in said chambers and having upper and lower portions of a size corresponding to the respective diameters of said chambers, said piston being movable between first and second positions and having an axial bore therethrough extending from its upper through its lower sides, an inlet port at the lower end of said casing communicating with the lower side of said piston, an exhaust port connected to atmosphere at the upper end of said casing, and a control port intermediate the ends of said casing communicating with said upper chamber below the stepped portion of said piston, a spring acting on said piston to resist movement thereof from its first to its second position, a fluid passage means in said piston for communicating said bore at all times with said control port and the stepped portion of said piston, a first member in said casing having one end fixed to the upper end of said casing and a free end projecting axially downwardly, a second member axially positioned in said bore with one end thereof being intermediate the ends of the bore when said piston is in its first position, resilient means for constantly maintaining said second member in a position where the opposite end thereof engages the free end of the first member, said second member having a passage therethrough communicating with said exhaust port, and the lower end of said passage forming an exhaust orifice which connects said control port to atmosphere through said fluid passage means and bore when said piston is in its first position, a single disc valve resiliently urged into sealing engagement with the lower end of said bore when said piston is in its first position, said valve when said piston is in its second position sealingly engaging said orifice to disconnect said control port from atmosphere and being disengaged from the end of said bore to connect said inlet port with said bore and said control port.

11. A governor comprising a body having an inlet port and chamber and a control port and chamber, said control chamber being of a greater cross-sectional size than said inlet chamber, a stepped piston in said body having an axial bore therethrough and having one portion slidingly received in said inlet chamber and a second portion slidingly received in said control chamber, spring means acting on said piston to oppose the pressure of said inlet chamber, a first member having a free end axially received in said bore and having an exhaust orifice therein, a second member having one end fixed in the body and the other end contacting said first member, a pressure port in said piston coaxially arranged with respect to said bore for affording a connection through said piston from said inlet to said control chambers, said piston being movable between two positions, a single disc valve, resilient means normally urging said valve to close said connection, said valve, port and orifice being arranged that when said piston is in its first position said valve engages said port to disconnect said inlet and control chambers and is out of engagement with said orifice to connect said control chamber to exhaust, and when said piston is in its second position said valve is disengaged from said port to connect said inlet and control chambers and engaged with said orifice to disconnect said control chamber from exhaust, movement of said piston between its positions effecting engagement and disengagement of said valve with said port and orifice so that opening of one and closing of the other admits or exhausts pressure from ore to the portion of said piston in said control chamber whereby said piston upon opening or closing of said port or orifice thereafter moves with a snap action.

No references cited.